30-233 S8
7/21/87 X3 RE 32,460

United States Patent [19]

Leggett, Jr.

[11] E Patent Number: Re. 32,460

[45] Reissued Date of Patent: Jul. 21, 1987

[54] DISKETTE PUNCH WITH ATTACHED GAGE

[75] Inventor: Archie L. Leggett, Jr., Lauderhill, Fla.

[73] Assignee: R & L Enterprises, Inc., Philadelphia, Pa.

[21] Appl. No.: 740,396

[22] Filed: Jun. 3, 1985

Related U.S. Patent Documents

Reissue of:

[64] Patent No.: 4,488,358
Issued: Dec. 18, 1984
Appl. No.: 490,330
Filed: May 2, 1983

[51] Int. Cl.[4] ..... B26F 1/32
[52] U.S. Cl. ..... 30/363, 30/233
[58] Field of Search ..... 30/363; 33/189

[56] References Cited

U.S. PATENT DOCUMENTS

| | | | |
|---|---|---|---|
| 299,210 | 5/1884 | Dunckleburg | 30/363 |
| 395,342 | 1/1899 | Nakashjian | 30/233 |
| 401,918 | 4/1889 | Woglom | 30/363 |
| 1,082,385 | 12/1913 | Zimmerman | 30/233 |
| 1,450,795 | 4/1923 | Dohe | 30/363 |
| 1,529,887 | 3/1925 | Harris et al. | 30/359 |
| 1,750,929 | 3/1930 | Griswold | 30/363 |
| 1,804,648 | 5/1931 | Scribner | 30/363 |
| 1,827,180 | 10/1931 | Williams | 30/363 |
| 1,928,120 | 9/1933 | Winton . | |
| 2,340,937 | 2/1944 | Curtis | 30/363 |
| 2,734,569 | 2/1956 | Neudauer | 33/189 X |
| 4,488,358 | 12/1984 | Leggett, Jr. | 30/233 |

*Primary Examiner*—Jimmy C. Peters
*Attorney, Agent, or Firm*—Oltman and Flynn

[57] ABSTRACT

A punch having a gage attached to one jaw which has at least two mutually perpendicular lips for engagement with two mutually perpendicular edges of the jacket of a magnetic record diskette. The gage locates the opening which the punch will form in the jacket.

4 Claims, 9 Drawing Figures

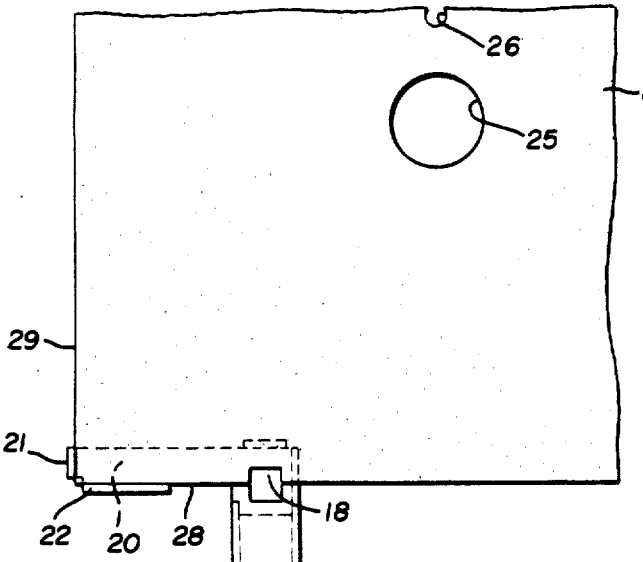
FIG. 4
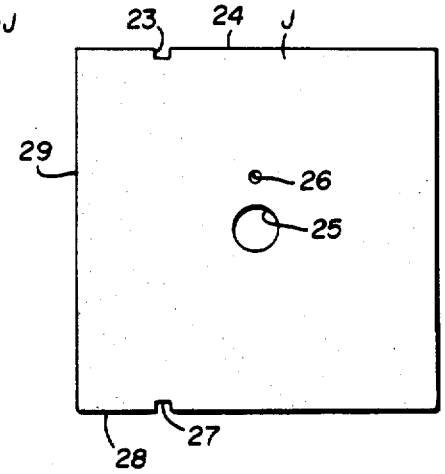
FIG. 5
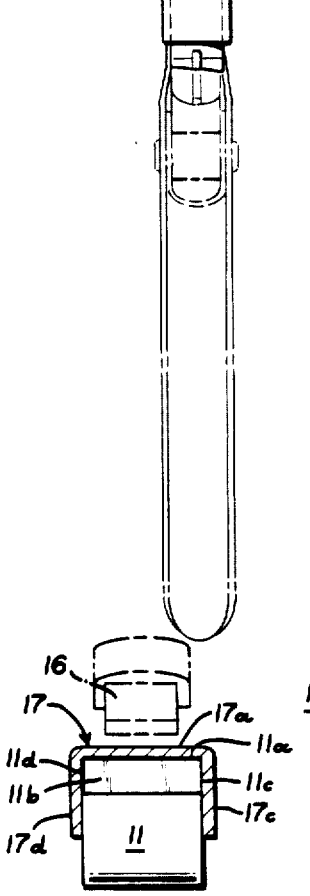
FIG. 3
FIG. 1
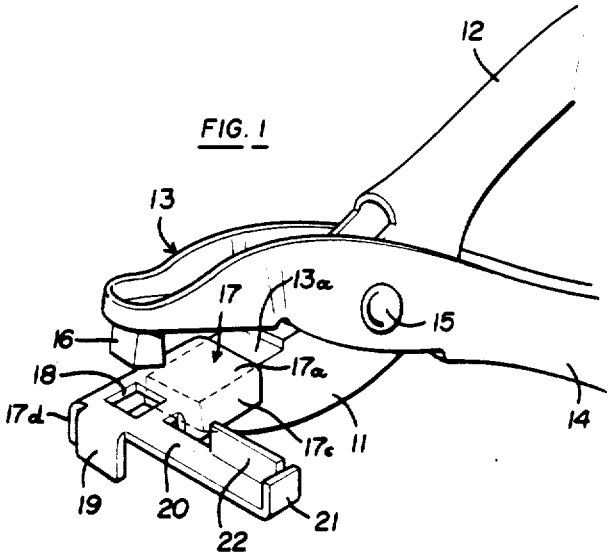
FIG. 2
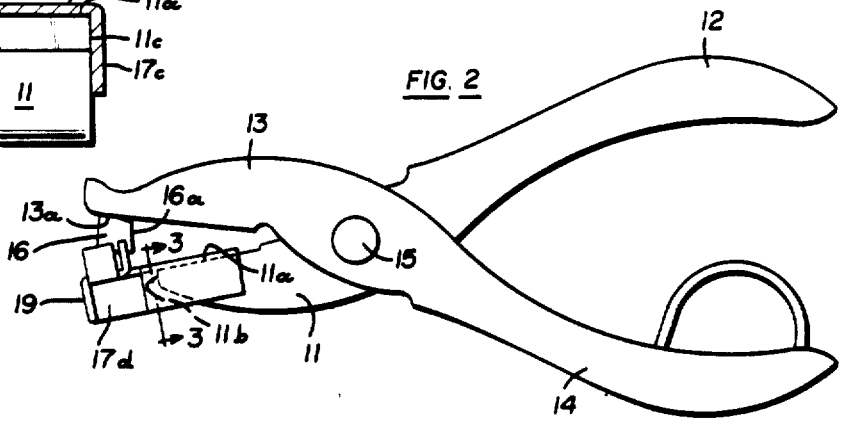

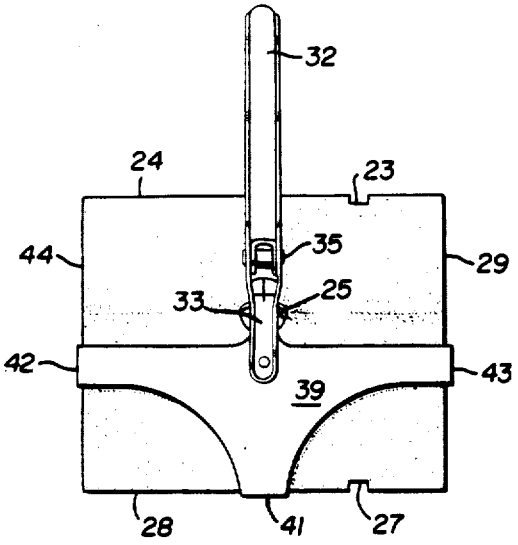
FIG. 7
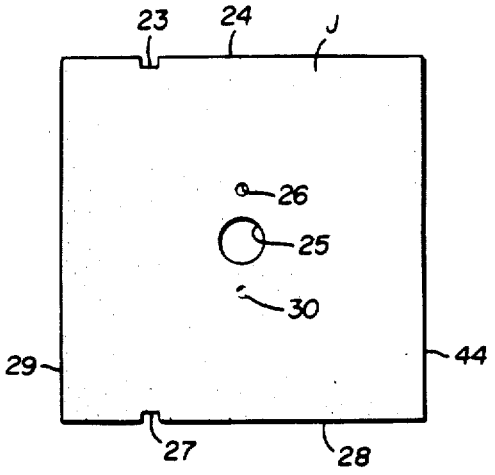
FIG. 9
FIG. 8
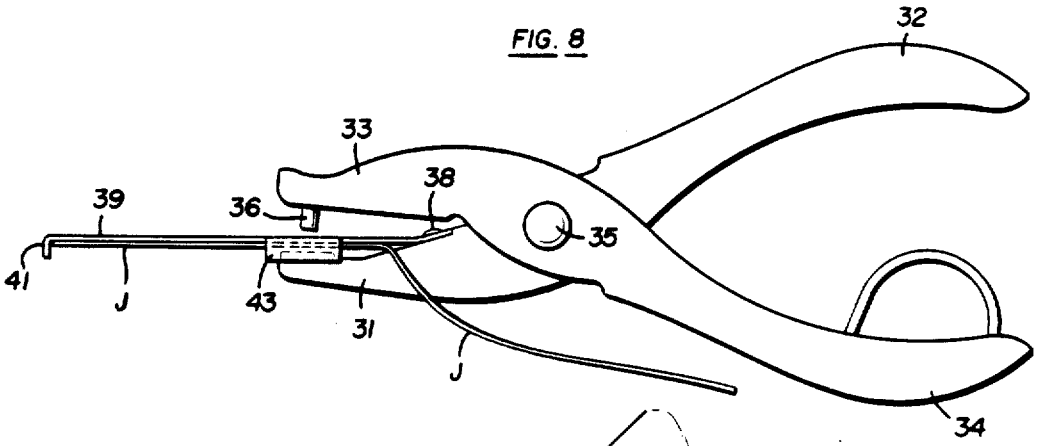
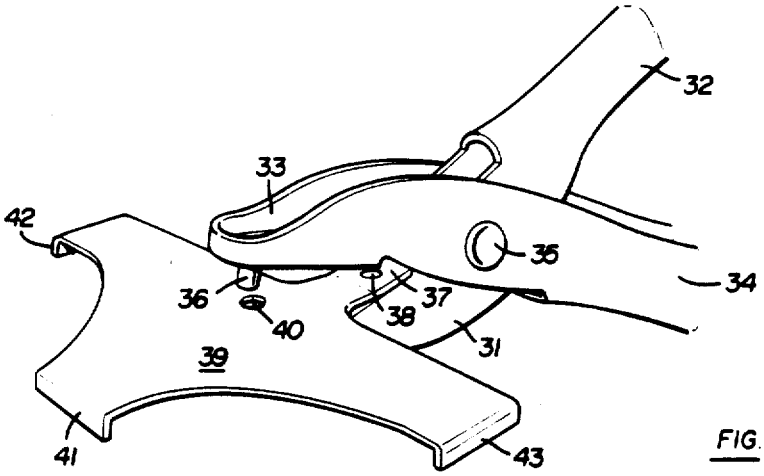
FIG. 6

DISKETTE PUNCH WITH ATTACHED GAGE

Matter enclosed in heavy brackets [ ] appears in the original patent but forms no part of this reissue specification; matter printed in italics indicates the additions made by reissue.

BACKGROUND OF THE INVENTION

Standard-sized magnetic record diskettes are commercially available which have a thin, flexible, circular magnetic record disc inside a rectangular envelope or jacket. Both the record disc and its jacket have a circular central opening for receiving a hub on the recording/playback machine which rotates the record disc during a recording or playback operation. The jacket has a rectangular notch in one edge which receives a finger in the recording/playback machine to enable the machine to record on the record disc in the jacket or to reproduce data previously recorded on the record disc. The jacket also has a small circular opening, located on one side of the larger central opening in the jacket and the disc, which is used for timing purposes in the operation of the recording/playback machine.

Diskettes of this general type are used to record on, and play back from, only one face of the record disc. The recording capacity of the opposite face of the disc is not used because the single rectangular notch and the single timing opening in the jacket cooperate with the recording/playback machine only for recording on or reproducing data from the one face of the record disc.

SUMMARY OF THE INVENTION

The present invention is directed to a novel punch with an attached gage for use on the jacket of such a diskette to enable both faces of the record disc to be used for recording and reproduction purposes.

The punch itself preferably is manually operated, having pivoted opposite jaws which are actuated toward each other to punch an opening in the jacket of the diskette. In accordance with the present invention, the punch has a gage which engages at least two mutually perpendicular edges of the jacket to properly locate the position where the opening will be formed in the jacket by operating the punch.

One embodiment of the present punch is used to form an opening in the form of a rectangular notch in the opposite edge of the diskette jacket from the edge which already has such a notch.

Another embodiment of the present punch is used to form a small, circular, off-center timing opening in the diskette jacket on the opposite side of the hub-receiving central opening in the jacket and the record disc from the timing opening already present in the jacket.

A principal object of this invention is to provide a novel punch which is used for doubling the effective recording/playback capacity of a magnetic record diskette.

Another object of this invention is to provide such a punch for converting a magnetic record diskette which is useful only for recording on and reproduction from one face of its record disc to one which is useful for recording on and reproduction from both sides of the disc.

A specific object of this invention is to provide a novel hand-operated punch for forming a rectangular notch in one edge of the jacket of a magnetic record diskette at a location effective to enable recording on a previously unused face of the diskette's record disc.

Another specific object of this invention is to provide a novel hand-operated punch for forming a timing opening in the jacket of a magnetic record diskette to enable recording on a previously unused face of the diskette's record disc.

Further objects and advantages of this invention will be apparent from the following detailed description of two presently preferred embodiments, which are illustrated in the accompanying drawings.

DESCRIPTION OF THE DRAWINGS

FIG. 1 is a perspective view of a punch according to the present invention for punching a rectangular notch in one edge of the jacket of a magnetic record diskette;

FIG. 2 is a side elevation of this punch;

FIG. 3 is a cross-section taken along the line 3—3 in FIG. 2;

FIG. 4 is top plan view showing this punch engaging the diskette jacket to form the notch;

FIG. 5 is a top plan view of the diskette jacket after formation of the notch in one edge by the punch of FIG. 1;

FIG. 6 is a perspective view of a punch according to the present invention for punching an off-center timing hole in the jacket of a record diskette;

FIG. 7 is a top plan view showing the FIG. 6 punch engaging the diskette jacket to form this timing hole;

FIG. 8 is a side elevation of the punch and diskette jacket assembly shown in FIG. 7; and FIG. 9 is a top plan view of the finished diskette jacket after both the punch of FIG. 1 and the punch of FIG. 6 have been used.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

DETAILED DESCRIPTION

Referring first to FIG. 2, the punch shown there has a one-piece first arm which presents a lower jaw 11 and an upper handle 12 and a one-piece second arm which presents an upper jaw 13 and a lower handle 14. The two arms of the punch are pivoted to each other at 15.

The upper jaw 13 has a flat bottom wall 13a. A punch element 16 of rectangular cross-section extends down perpendicularly from this bottom wall of the upper jaw and presents a flat bottom face which extends parallel to (and below) the bottom wall of the upper jaw. The back face 16a of punch element 16 extends at a slightly acute angle (such as 85°) upward and inward from its flat bottom face, whereas the other three side faces of punch element 16 extend perpendicular to its bottom face.

The lower jaw 11 of the punch is substantially shorter than its upper jaw 13. It presets a flat upper face 11a and an outer end face 11b extending perpendicular to its upper face. As shown in FIG. 3, the lower jaw has flat opposite side faces 11c and 11d which extend down perpendicularly from its top face 11a and parallel to each other.

In accordance with the present invention, a gage is attached to the lower jaw 11 of the punch to properly locate the hole (a rectangular notch) which its punch element 16 will form in one edge of the jacket of the magnetic record diskette. As best seen in FIG. 1, this gage has an inverted channel-shaped mounting segment 17 which fits snugly over the lower jaw 11 and is soldered or otherwise rigidly joined to it. As shown in FIG. 3, this mounting segment 17 of the gage has spaced, parallel, opposite side walls 17c and 17d, which respectively engage the opposite side faces 11c and 11d of the lower jaw, and a flat top wall 17a, which overlies the top face 11a of the lower jaw 11 of the punch.

As shown in FIG. 1, the top wall 17a of the gage extends outward beyond the outer end face 11b of the lower jaw and presents a rectangular opening 18 which snugly but slidably receives the punch element 16 when the two jaws of the punch are brought together. Beyond this opening 18 the gage has a depending end wall 19, which extends down from its top wall 17a parallel to and spaced outward from the outer end face 11b of the lower jaw 11, as shown in FIG. 2. The side wall 17d of the gage extends out beyond the lower jaw 11 of the punch almost to the end wall 19.

The gage has a flat extension 20 on its outer end which is a co-planar continuation of its top wall 17a and extends to the opposite side of the lower jaw 11 of the punch from the gage side wall 17d. Viewed from above in FIG. 1, this extension 20 is a rectangle which is elongated laterally outward from the lower jaw. On the outer end of extension 20 an end lip 21 extends up perpendicularly. Along the inner edge of extension 20 near its outer end a side lip 22 extends up perpendicular to both the extension 20 itself and the end lip 21. The extension 20 and lips 21 and 22 together define a three-sided rectangular recess for receiving one corner of the rectangular jacket of a magnetic record diskette.

Referring to FIG. 5, the commercially available diskette jacket J comes with a single rectangular notch 23 in one edge 24, a central circular opening 25 for receiving the hub of the recording/reproducing machine, and a small circular timing opening 26 located near the central opening 25 toward the side edge 24 having the rectangular notch 23. The punch of FIG. 1 may be used to punch a second rectangular notch 27 in the opposite edge 28 of the diskette jacket at the same distance from the adjacent end edge 29 of the jacket as the notch 23 in the side edge 24.

Referring to FIG. 4, the gage 17–22 on the lower jaw 11 of the punch is placed beneath the diskette jacket with the end lip 21 of the gage engaging the end edge 29 of the jacket, the side lip 22 of the gage engaging the side edge 28, and the extension 20 of the gage engaging the bottom of the jacket. This positions the gage opening 18 at the correct location along the side edge 28 of the jacket, the same distance from the end edge 29 of the jacket as the notch 23. Therefore, when the punch is operated, the rectangular punch element 16 on its upper jaw 13 cooperates with the opening 18 to form the rectangular notch 27 (FIG. 5) at the correct location along the side edge 28 of the diskette jacket J. When the diskette is inverted from the position shown in FIG. 5, the notch 28 occupies the position previously occupied by the notch 23, and in this position it will receive the finger in the recording/playback machine to enable the machine to record on or reproduce from the record disc in the diskette.

A second timing opening of the same size as the opening 26, but on the opposite side of the central opening 25 in the jacket, is formed by the punch shown in FIG. 6. This second timing opening is shown at 30 in FIG. 9, which shows the finished diskette jacket after both the punch of FIG. 1 and the punch of FIG. 6 have been used.

Referring to FIG. 8, the punch for forming the second timing opening 30 has a one-piece first arm which presents a lower jaw 31 and an upper handle 32 and a one-piece second arm which presents an upper jaw 33 and a lower handle 34. The two arms of the punch are pivoted to each other at 35.

The outer end of the lower jaw 31 of the punch is shaped and dimensioned to pass down through the central opening 25 in the opposite side of the diskette jacket J from the side where the first timing opening 26 is formed. As indicated in FIG. 8, when this punch is being used, the outer end of its lower jaw 31 is between this opposite side of the jacket J and the record disc inside the jacket. The rest of the lower jaw 31 and the attached handle 32 are outside the jacket, as are the entire upper jaw 33 and its attached handle 34.

The upper jaw 33 of the punch carries a downwardly projecting punch element 36 of circular cross-section corresponding to the desired size of the second timing opening 30 it will form in the jacket J of the diskette.

In accordance with the present invention, this punch incorporates a gage for positioning it properly in accordance with the desired location for the second timing hole 30 in the diskette jacket J. Hole 30 is in phantom in FIG. 9 to show that it is in the opposite side of the jacket from the side having the first timing hole 26. As shown in FIGS. 6 and 8, this gage has a generally flat elongated mounting segment 37 which overlies the lower jaw 31 toward the pivot 35. This mounting segment is rigidly attached to the lower jaw, such as by a rivet 38.

Outward from its mounting segment 37 the gage presents a flat top wall 39 having a circular-opening 40 which is positioned and dimensioned to pass the punch element 36 on the upper jaw 33 when the punch is actuated.

The top wall 39 of the gage extends outward from the lower jaw 31 to a depending end lip 41, which extends down perpendicular to the top wall 39 for engagement with side edge 28 of the diskette jacket J, as shown in FIG. 7.

On the right side in FIGS. 6 and 7, the top wall 39 of the gage extends laterally outward from the lower jaw 31 of the punch to a depending side lip 43, which extends down perpendicular to the top wall 39 and perpendicular to the end lip 41 for engagement with the end edge 29 of the diskette jacket J, as shown in FIG. 7. On the left side in FIGS. 6 and 7, the top wall 39 of the gage extends laterally outward from the lower jaw 31 of the punch to a depending side lip 42, which extends down perpendicular to the top wall 39, parallel to the opposite side lip 43, and perpendicular to the end lip 41. This side lip 42 is engageable with an opposite end edge 44 of the diskette jacket J, as shown in FIG. 7. The spacing between the opposite side lips 42 and 43 on the gage is substantially equal to the distance between the opposite end edges 29 and 44 of the diskette jacket J, so that the jacket fits snugly between these side lips when the top wall 39 of the gage overlies the jacket.

The top wall 39 and the end and side lips 41, 42, and 43 of the gage define a four-sided rectangular recess for snugly receiving the diskette jacket J, as shown in FIG. 7.

As shown in FIG. 8, in the use of this punch its gage 39, 41, 42, 43, is slid over the diskette jacket J from the latter's edge 24 toward the opposite edge 28, and the outer end of the lower jaw 31 of the punch is passed down through the central opening 25 in the side of the jacket opposite the side which has the first timing opening 26. When the depending lips 41, 42 and 43 on the gage engage the respective edges 28, 44 and 29 of the diskette jacket, the opening 40 in the top wall 39 of the gage is at the correct location for the second timing opening 30 in the jacket. This will be at the same distance from the adjacent side edge 28 of the jacket as the distance of the first timing opening 26 from the nearer side edge 24 of the jacket.

When the punch is now operated, its punch element 36 will pass down through the opening 40 in the top of the gage and will punch out the second timing opening 30 in the jacket of the diskette. The diskette now is ready to record on or play back from either face of the record disc inside its jacket J.

Obviously, the punch of FIG. 6 may be used to form the second timing opening 30 in the diskette jacket before the punch of FIG. 1 is used to form the notch 27.

I claim:

1. In a punch for use on a magnetic record diskette jacket which has substantially flat opposite major faces and adjoining first and second straight edges extending between said faces perpendicular to each other, said punch having:

opposed first and second jaws which are movable toward and away from each other;

and a punch element on said first jaw projecting toward said second jaw;

the improvement which comprises a gage attached to said second jaw and presenting:

a flat wall formed with an opening positioned to receive said punch element when said first and second jaws are brought together;

a flat extension coplanar with said flat wall and located on one side of said jaws, said extension being elongated away from said opening to engage one of said faces of the diskette jacket elong said first edge of the jacket;

a side lip joined to said extension and extending perpendicular to the plate of said extension *and in lateral alignment with said opening* along the direction of elongation of said extension to engage said first edge of the diskette jacket when said extension engages said one face of the diskette jacket;

an end lip joined to said extension away from said opening past said side lip and extending perpendicular to the plate of said extension perpendicular to the direction of elongation of said extension to engage said second edge of the diskette jacket when said side lip engages said first edge of the diskette jacket;

said side lip and said end lip when in engagement respectively with said first and second edges of the diskette jacket positioning said opening in the gage *intersecting and* extending inward from said first edge of the diskette jacket, whereby said punch element forms a notch in the diskette jacket extending inward from said first edge thereof when the jaws of the punch are brought together.

2. A punch according to claim 1, wherein:

said opening in the gage is rectangular:

and said punch element has a rectangular cross-section and is slidably received snugly in said opening when the jaws are brought together.

3. In a punch for use on a magnetic record diskette jacket which has substantially flat opposite major faces and adjoining first and second straight edges extending between said faces perpendicular to each other, said punch having:

opposed first and second jaws:

pivot means pivotally connecting said jaws for movement toward and away from each other;

and a punch element on said first jaw projecting toward said second jaw;

the improvement which comprises:

a gage attached to said second jaw and presenting an opening positioned to receive said punch element when said first and second jaws are brought together:

said gage having an extension on one side of said opening which presents a recess that is open along the length of said extension on the side thereof away from said pivot means for the slidable insertion of the gage extension onto the diskette jacket from said first straight edge of the jacket, said recess in the gage extension being mounted on a side lip located on the side of the gage extension toward said pivot means *and laterally aligned with said opening* to engage said first straight edge of the diskette jacket and an end lip located belong said side lip away from said opening and extending perpendicular to said side lip for engaging said second straight edge of the diskette jacket received in said recess with its first straight edge engaging said side lip;

said side and end lips of the gage extension when they engage said first and second straight edges of the diskette jacket positioning said diskette jacket with said first straight edge crossing said opening in the gage, whereby said punch element forms a notch in the diskette jacket extending inward from said first edge thereof when the jaws of the punch are brought together.

*4. In a punch for use on a magnetic record diskette jacket which has substantially flat opposite major faces and adjoining first and second straight edges extending between said faces perpendicular to each other, said punch having:*

*a punch element mounted for movement back and forth between an operative punching position and a retracted position;*

*a gage on said punch having:*

*means defining an opening aligned with said punch element to receive said punch element when said punch element is actuated to said punching position;*

*and means defining a recess that is open in front of said opening, when said punch element is in its retracted position, for slidably receiving the diskette jacket to position said first straight edge of the diskette jacket crossing said opening in the gage, said means defining said recess comprising: (a) side lip means spaced from said opening and presenting an exposed surface laterally aligned with said opening for limiting the insertion of the diskette jacket into said recess from the front to a position in which said first edge of the diskette jacket engages said side lip means and crosses said opening; and (b) end lip means spaced laterally from said opening on one side and presenting an exposed surface which extends perpendicular to said exposed surface of said side lip means and beyond said exposed surface of said side lip means toward the open front of said recess for engagement by said second straight edge of the diskette jacket when said first straight edge of the diskette jacket engages said side lip means;*

*said side and end lip means providing mutually perpendicular limit stops for engagement respectively by said first and second edges of a diskette jacket inserted into said recess, whereby said punch element, when actu-*

*ated from its retracted position to its punching position, cuts a notch in the diskette jacket extending inward from said first edge thereof.*

* * * * *